Nov. 21, 1933.  J. Q. SHUNK  1,936,528
GOVERNOR FOR GRAVITY DUMP BODIES
Filed March 12, 1931  2 Sheets-Sheet 1
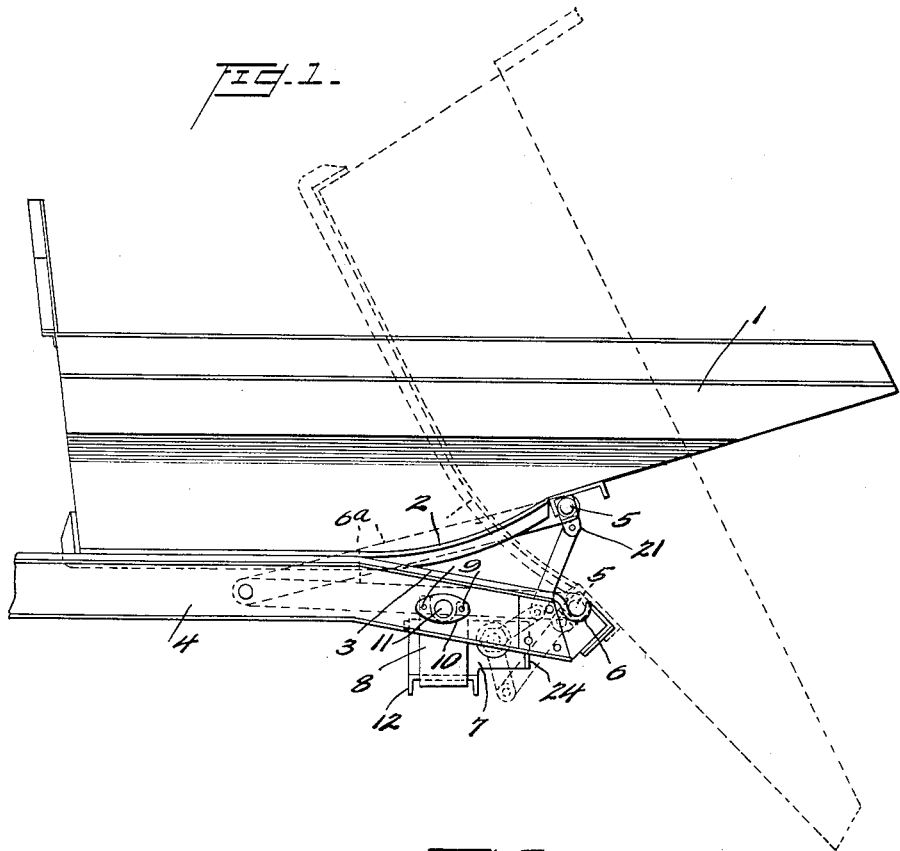
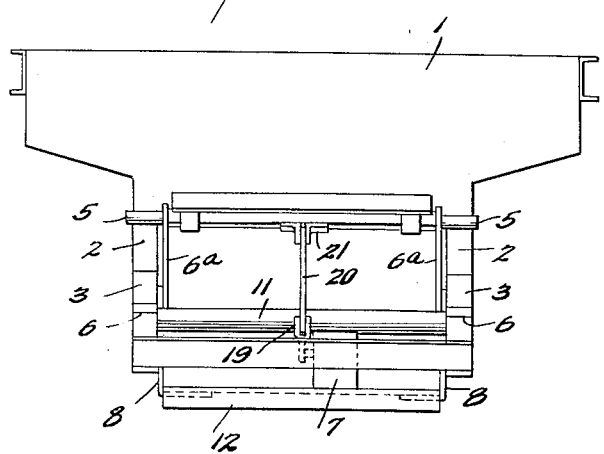

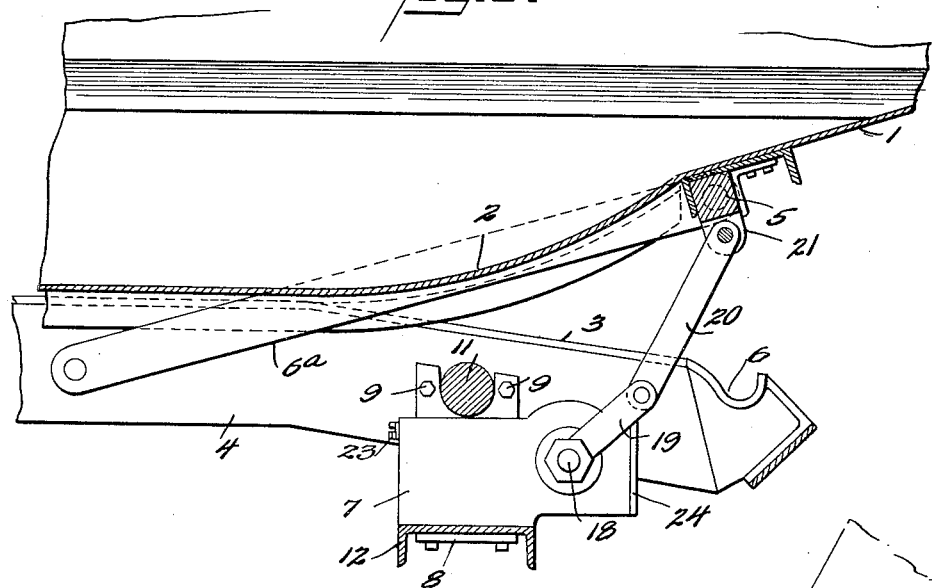
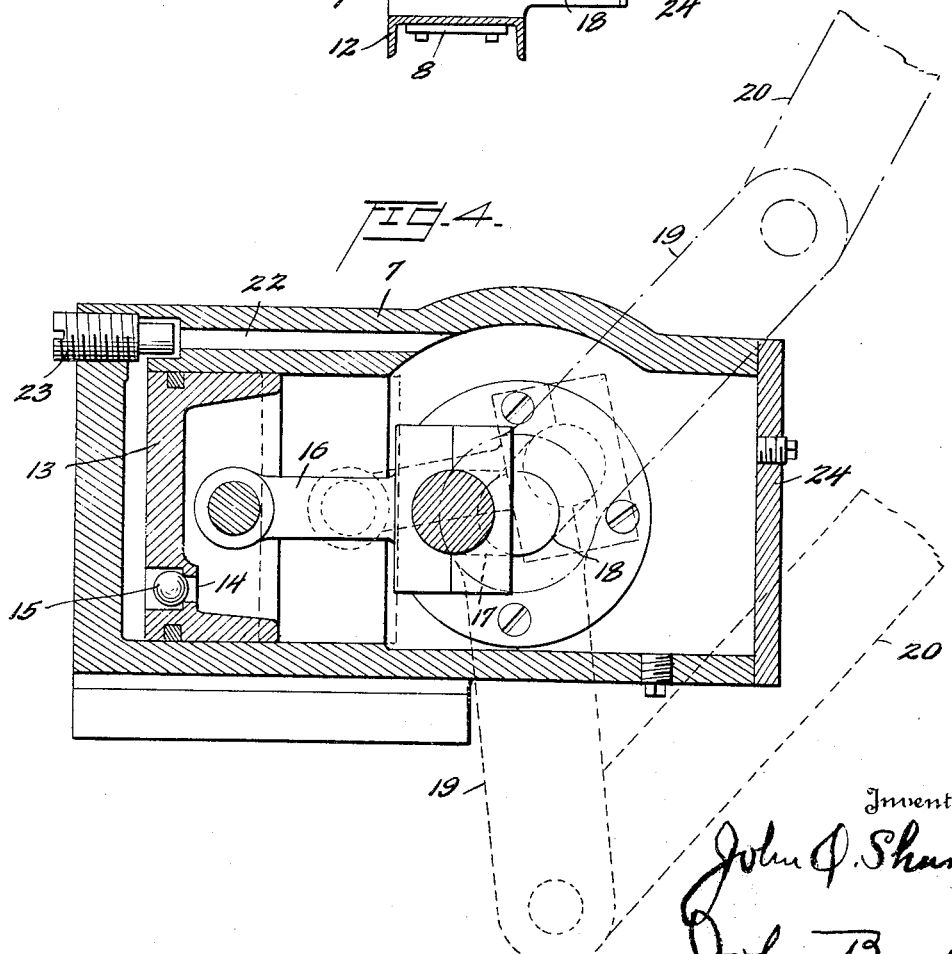

Patented Nov. 21, 1933

1,936,528

UNITED STATES PATENT OFFICE 1,936,528

GOVERNOR FOR GRAVITY DUMP BODIES

John Q. Shunk, Bucyrus, Ohio

Application March 12, 1931. Serial No. 522,040

2 Claims. (Cl. 298—10)

My invention relates to gravity type dump trucks and one of the objects is to govern or control the fall of the dump body, after the body of the truck moves to dumping position to unload on return of the body to loading position, it is desirable to reduce to a minimum the impact of the body with the frame members, which at present is a destructive force on practically all gravity dump bodies.

A further object is to provide a device which is capable of wide application where it is desired to govern or control the rate of fall or return of a falling body.

A still further object is to provide a governing device that is constructed with a minimum number of moving parts mounted directly under the center of gravity of the body, completely enclosed so as not to be affected by dirt and grit.

With these and other objects in view, my invention consists of certain novel and peculiar features of construction and combination of parts as will be hereinafter more fully described and particularly pointed out in the appended claims.

Referring to the drawings for a more complete disclosure of the invention:

Fig. 1 is a side elevation of a gravity type dump body with the gravity governor, the dotted lines showing the dumping position, Fig. 2 is a rear view of Fig. 1 with the dump body in loading position, Fig. 3 is an enlarged fragmentary longitudinal vertical section, and Fig. 4 is a vertical longitudinal section of the governor.

The dump body 1 is provided with a rocker section 2, which when the loaded body is tipped will roll down the inclined portion 3 of the frame members 4, until the pivot bar 5 comes in contact with the stop brackets 6, carried by the frame members, after which the body will pivot on these points, until the body is at a dumping angle of about 65 degrees or more, in which position the body locks and remains locked until released. A body connecting link 6a is pivoted to the frame members 4 at one end and the other end is pivoted to the pivot bar 5 and in this manner the link always holds the exact relation of the pivot bar and stop brackets.

The governor 7 is carried by suspended brackets 8 which are attached to the frame members 4 by the same bolts 9 as secure the bearings 10 in position for the trip shaft 11. On these brackets is mounted a cross channel 12, which is the base upon which the governor body is mounted.

The governor comprises a closed chamber containing oil or other suitable viscous liquid and in the cylinder thereof is a piston 13, that is provided with a port 14 having a ball check valve 15 therein. The piston is pivoted to a connecting rod 16, which is in turn pivoted to a crank 17, the crank shaft 18 projecting outside of the chamber. Keyed to the crank shaft outside of the chamber is a crank lever 19, which in turn is pivoted to the body connecting link 20. The link 20 is pivoted to the body connecting brackets 21.

The governor is provided with a by-pass or return port 22 and a regulating valve 23 therefor. A cover plate 24 closes the rear end of the cylinder block.

When the body falls to dumping position the connecting link 20, moves the crank lever 19 to the down position and since the crank lever is keyed to the crank shaft 18, the crank 17 rotates, and moves the piston 13 rearward, through the medium of the connecting rod 16. The ball valve then unseats permitting the liquid to pass slowly through the port.

When the body has been dumped and returns to horizontal or loading position due to a preponderance of weight at the front of the body when empty, the piston then moves in the opposite direction away from the crank shaft. As the piston moves forward or away from the crank shaft, the check valve 15 closes and the liquid can escape only through the regulating valve 23 and the by-pass 22 to the back or reservoir end of the governor. The liquid being under pressure acts as a slowly contracting cushion, thus controlling the rate of fall of the body, which can be varied or regulated at will by the regulating valve 23. The liquid used in the governor is such that it remains in a condition having substantial constant viscosity regardless of climatic conditions.

With the above described construction, it will be seen that the piston moves only during the rolling motion of the body, there being no movement of the links 19 and 20 during the pivotal motion of the body.

I am aware that the invention may be embodied in other specific forms without departing from the spirit or essential attributes thereof and I desire the present embodiment to be considered in all respects as illustrative and not restrictive, reference being had to the appended claims rather than to the foregoing description to indicate the scope of the invention.

I claim:

1. A dump truck having a body provided with rocker sections, frame members having an inclined portion on which the rocker sections roll, stop brackets carried by the frame members, a pivot bar carried by the body and engaging the stop brackets after which the body will continue to pivot on said brackets until the final dumping position has been reached, a fluid check device provided with a piston and mounted on the frame under the body and a linkage connected to the body and piston, the piston remaining stationary after the pivot bar has engaged the stop brackets and while the body is pivoting to and from dumping position.

2. A dump truck having a body, frame members relative to which the body tilts, the body having a successive rolling and pivotal motion to and from dumping position, a fluid check device mounted on the frame, a linkage connecting the body and fluid check device that operates the said check device only during the rolling motion.

JOHN Q. SHUNK.